Patented Nov. 6, 1934

1,979,469

UNITED STATES PATENT OFFICE 1,979,469

STABILIZATION OF SUSPENSIONS

Alfred Julius Johnson, Pennsgrove, N. J., assignor to E. I. du Pont de Nemours & Company, Wilmington, Del., a corporation of Delaware No Drawing. Application January 23, 1931, Serial No. 510,773

16 Claims. (Cl. 8—6)

This invention relates to the stabilization of suspensions of finely divided solids, that is the maintenance of such suspensions in a uniform state. More particularly it relates to the prevention of settling and/or the formation of froth or foam in dye pastes.

One of the great disadvantages in the marketing of dyes or other finely divided solids in the form of pastes or suspensions has been that such preparations were not stable, that is to say, upon storage or standing the solid material settled to the bottom of the container where it formed a hard cake which was entirely unsuited for further treatment. In some instances a layer of froth or foam formed on top of the composition that was originally a homogeneous suspension.

In an effort to overcome these objectionable tendencies various materials have been added to the suspensions for the purpose of maintaining a uniform state. In the past certain naphthalene derivatives have been widely used for this purpose. Their beneficial results are of a temporary character, however, and in spite of the fact that a marked dispersive action is present the resulting pastes are ordinarily unstable and the dye or other solid settles out on standing.

This invention has for an object the preparation of improved compositions of matter. A further object is the prevention or retardation of separation, settling, foaming or other processes resulting in non-homogeneity of suspensions or pastes or finely divided solids such as dyes. Other objects are the stabilization of dye pastes, the preparation of novel dye pastes, the prevention of agglomeration of dye particles in the suspension, the production of homogeneous dye pastes and in general an advancement of the art. Other objects will appear hereinafter.

These objects are accomplished by the incorporation of a water soluble alkali metal salt of cellulose glycollic acid into the suspensions or pastes.

The alkali metal or like salts of cellulose glycollic acid are ordinarily produced by treating cellulose with a caustic akali solution, reacting the resulting alkali cellulose with chloracetic acid and when necessary thereafter neutralizing the caustic alkali. The product obtained by Sakurada (Zeitschrift fur Angew, Chemie 42, 640-3; 1929) is suitable for use in this invention.

The invention will be fully understood from a consideration of the following examples in which the parts are given by weight.

Example I

Five (5) parts of a 5% solution of cellulose sodium glycollate, which is a very viscous jelly-like mass, were added to 100 parts of a 10% suspension of $6:6'$-di-ethoxy-thio-indigo containing a dispersing agent and incorporated therein by means of a colloid mill. The resulting paste was a homogeneous suspension which was stable on standing after several weeks. A paste of the same compound treated in the same manner but omitting the addition of the cellulose compound separated into three layers, namely, a foamy layer on top, a water suspension containing less than 10% of dyestuff in the middle and a deposit of the solid on the bottom. The re-working of the settled dyestuff to produce a homogeneous suspension was extremely difficult.

Example II

From 3 to 5 parts of a 5% solution of cellulose sodium glycollate were added to 100 parts of a 15% suspension of $6:6'$ - di - chloro - $4:4'$ - di-methyl-thio-indigo and incorporated as in Example I. The paste thus treated showed no tendency to settle with the formation of a water layer on top as was the case with the same material to which had not been added the cellulose compound.

Example III

Five (5) parts of a 5% solution of cellulose sodium glycollate were incorporated into 100 parts of a 20% suspension of indigo containing a dispersing agent (Bindex, that is sulphite cellulose pitch). The paste thus produced was stable on standing and showed no separation of the dye resulting in a cake on the bottom as was the case with the same material when the cellulose compound was not present.

Example IV

Five (5) parts of a 5% solution of cellulose sodium glycollate were added and incorporated into 100 parts of a 17% suspension of the thio-indigoid dye sold under the name of sulfanthrene scarlet G. The resulting paste was homogeneous and remained so on standing showing no separation of the dye on the bottom of the container as was the case in the absence of the cellulose glycollate.

Example V

Five (5) parts of a 5% solution of cellulose sodium glycollate were added and incorporated with 100 parts of a 20% suspension of $5:5'$-dichloro-7:7'-di-methyl-thio-indigo. The resultant paste remained homogeneous on standing while a similar paste without the cellulose sodium glycollate gave a sediment of separated dye in the form of a very hard cake which was broken up and reincorporated in a uniform suspension only with very great difficulty.

Example VI

Five (5) parts of a 5% solution of cellulose sodium glycollate were added and incorporated with 100 parts of a 20% suspension of the dye hydron blue G (C. I. 971). The resulting paste gave no separation of dyestuff as a sediment on the bottom of the container as did the same product without the cellulose glycollate.

Example VII

From 5 to 10 parts of a 5% solution of cellulose sodium glycollate were added and incorporated with 100 parts of a 22% suspension of du Pont vat yellow 8G (an anthraquinone vat dye made under Lulek's United States of America Patent 1,705,023). The resultant paste did not give a hard difficultly incorporated sediment of dyestuff on standing as did the product without the cellulose compound.

Example VIII

Five (5) parts of a 5% solution of cellulose sodium glycollate were incorporated into 100 parts of a 48% suspension of du Pont naphthanil scarlet ("Base" C. I. 118). The resulting paste did not settle out as was the case with the material with the addition of the cellulose compound.

The optimum amount of the cellulose glycollate compound to be added to the suspension may be readily determined by test. Such factors as the chemical properties of the solid in the suspension, the physical condition of the suspension and the purpose for which it is to be used will determine the proper amount. In general the amount of the alkali metal salt of cellulose glycollic acid used is less than 1% based on the dye paste. In most cases 0.25% has been found sufficient. It is ordinarily possible to use an amount of a cellulose glycollate which is insufficient to prevent settling, but even in such a case the settling is retarded and the material which settles out is softer in texture than is the case in the absence of the cellulose compound. In addition it is more easily reincorporated by stirring.

The cellulose glycollate compound may be satisfactorily employed in any of its various forms. For example, it may be used as the crude reaction mass, in solutions of the crude reaction mass, the purified isolated and dried product, convenient solutions of the last mentioned material or any desired mixture of these forms.

This invention is not limited to the improvement of the particular dye pastes given in the above examples but it is applicable to dye pastes in general regardless of the composition or concentration of the dye and to aqueous suspensions of finely divided solids in general.

Other means of efficient stirring or mixing than a colloid mill may be employed when desired.

The addition of the alkali metal or equivalent salts of celulose glycollic acid to aqueous dispersions of dyes or to dye pastes stabilizes the resultant compositions by overcoming their tendency to settle out or otherwise become non-homogenous on standing. The water soluble compounds of this invention not only prevent the settling of the dye itself but may in addition prevent the separation of a foamy top layer.

This invention has many distinct advantages among which may be mentioned (1) the utilization of a small amount of an easily prepared, stable and inexpensive material, (2) the utilization of a compound which is extremely stable toward fermentative decomposition, (3) the utilization of a compound which is very soluble in water, (4) the utilization of a compound, the application of which is universal and not limited to specific solids, (5) the utilization of a compound having no tendency to the formation of froth, (6) the utilization of a compound which is not temporary in its action, (7) the utilization of a compound which does not require special or careful manipulation in its use, (8) the utilization of a compound which does not necessitate the change in acidity or alkalinity of the resultant suspension, (9) the utilization of a compound which does not limit the processes for which this resultant suspension may be used, and (10) the utilization of a compound which functions in the presence or absence of dispersing agents.

As many apparently widely different embodiments of this invention may be made without departing from the spirit and scope thereof, it is to be understood that I do not limit myself to the specific embodiments thereof except as defined in the appended claims.

I claim:

1. A composition of matter consisting of a dye, water and cellulose sodium glycollate in an amount less than 1%.

2. A composition of matter consisting of a dye, water and a cellulose alkali metal glycollate in an amount less than 1%.

3. A dye paste comprising a celulose alkali metal glycollate in an amount less than 1%.

4. A dye paste comprising a cellulose alkali metal glycollate.

5. The art which comprises incorporating an alkali metal salt of cellulose glycollic acid into a dye paste.

6. The art which comprises incorporating an alkali metal salt of cellulose glycollic acid into an aqueous dye suspension.

7. The art which comprises incorporating an alkali metal salt of cellulose glycollic acid into an aqueous finely divided dye suspension.

8. The art of preventing finely divided dyes from separating from their aqueous suspensions which comprises treating the suspension with an alkali metal salt of cellulose glycollic acid.

9. In the preparation of dye pastes, the step of incorporating into the dye paste an alkali metal salt of cellulose glycollic acid.

10. The method of stabilizing a dye paste against settling or other non-homogeneity which comprises incorporating into the paste a cellulose alkali metal glycollate in an amount less than 1%.

11. The process of preventing the separation of finely divided solids from their aqueous suspensions which comprises admixing the solids and water with a cellulose alkali metal glycollate.

12. The prevention or retardation of separation of a dye from its dispersed paste which comprises mixing an alkali metal salt of cellulose glycollate with the dye in the preparation of the paste.

13. A dye paste comprising a water soluble cellulose glycollate.

14. The production of non-settling suspensions of finely divided dyes which comprises admixing the dye and suspension agent with an alkali metal salt of cellulose glycollic acid adapted to maintain the suspension in a non-settling condition.

15. In the stabilzation of dye suspensions, the step which consists in bringing a suspension of a dye into admixture with cellulose alkali metal glycollate material adapted to maintain the suspension in homogeneous condition.

16. The production of non-settling suspensions of finely divided dyes which comprises admixing the dye and suspension agent with sodum cellulose glycollate adapted to maintain the suspension in a non-settling condition.

ALFRED J. JOHNSON.

CERTIFICATE OF CORRECTION.

Patent No. 1,979,469.  November 6, 1934.

ALFRED JULIUS JOHNSON.

It is hereby certified that error appears in the printed specification of the above numbered patent requiring correction as follows: Page 1, line 33, for "or" read of; and that the said Letters Patent should be read with this correction therein that the same may conform to the record of the case in the Patent Office.

Signed and sealed this 8th day of January, A. D. 1935.

Leslie Frazer (Seal)   Acting Commissioner of Patents.